United States Patent [19]

Pence

[11] 4,402,154

[45] Sep. 6, 1983

[54] METHODS AND APPARATUS FOR CLASSIFYING MARINE ITEMS

[75] Inventor: Paul E. Pence, Destin, Fla.

[73] Assignee: Marine Classifiers, Inc., Destin, Fla.

[21] Appl. No.: 241,562

[22] Filed: Mar. 18, 1981

[51] Int. Cl.³ ............................................ A01K 73/02
[52] U.S. Cl. ........................................................ 43/9
[58] Field of Search ...................... 43/9, 14, 104, 106; 114/221; 209/233, 235, 250, 252, 259, 268, 421

[56] References Cited

U.S. PATENT DOCUMENTS

| | | | |
|---|---|---|---|
| 735,545 | 8/1903 | Mayhew | 43/104 |
| 1,548,413 | 8/1925 | De Voogt et al. | 43/9 |
| 1,692,830 | 11/1928 | Hansen et al. | 43/9 |
| 2,056,772 | 10/1936 | Dahl | 43/9 |
| 2,948,980 | 11/1960 | Worcester | 43/9 |

FOREIGN PATENT DOCUMENTS

22822 of 1895 United Kingdom ..................... 43/9

Primary Examiner—Nicholas P. Godici
Assistant Examiner—M. Jordan
Attorney, Agent, or Firm—Lahive & Cockfield

[57] ABSTRACT

Methods and apparatus for classifying marine items wherein relatively larger and relatively smaller items are separated from a flow of water and marine items before this flow is contained and captured within marine-catch container means.

20 Claims, 10 Drawing Figures

METHODS AND APPARATUS FOR CLASSIFYING MARINE ITEMS

GENERAL BACKGROUND AND SUMMARY OF INVENTION

For decades, the international fishing industry has been concerned with the problems of separating undesired marine items from the more desirable catch-items.

For example, shrimp trawling operations have been plagued for years with problems involving the entrainment of trash, undesired large fish, and undesired small fish in the marine-catch container, i.e. the net-like bag referred to as the "cod-end" of trawling gear.

The entrainment of undesired large and small fish and trash in the catch bag tends to cause undesired crushing and bruising of the desirable, intermediate size shrimp, causes the trawler operator to haul the trawling gear at more frequent intervals than would be desired, and significantly reduces the amount of usable catch retrieved during any trawling operation. Such entrainment also results in the needless destruction of larger and smaller marien life.

Over the years, a variety of approaches have been employed by the fishing industry in an effort to properly and effectively segregate or handle marine catches. Representative of such prior art efforts are the following:

(1) Fish Classifiers Utilizing Trawler Nets With Sieves and "Spiller" Outlets for Trash, Etc.
   U.S. Pat. No. 3,015,903
   U.S. Pat. No. 3,440,752
   French Pat. No. 1,442,545
(2) Miscellaneous Trash Ejectors or Spillers
   U.S. Pat. No. 3,132,434
   U.S. Pat. No. 3,195,261
   U.S. Pat. No. 4,043,068
   British Pat. No. 405,405
   Canadian Pat. No. 714,269
   Canadian Pat. No. 729,367
(3) Fish Classifying Sieves Invorporated in Trawler Nets
   U.S. Pat. No. 589,047
   U.S. Pat. No. 1,745,251
   U.S. Pat. No. 2,618,879
   U.S. Pat. No. 2,948,980
   Canadian Pat. No. 609,882
(4) Trawler Nets with Conduits Leading to Tow-Boat
   U.S. Pat. No. 1,447,553
   U.S. Pat. No. 1,462,196
(5) Miscellaneous Fish Sorting and/or Classifying and/or Escape Devices
   U.S. Pat. No. 2,056,772
   U.S. Pat. No. 3,849,927
   U.S. Pat. No. 4,006,549
   U.S. Pat. No. 4,174,582
   U.S. Pat. No. 4,193,219
   "New Dutch Beam Trawl Stops Flatfish Slaughter", World Fishing, June 1965, pages 96 and 99.
   "U.S. Design for 'Separator' Shrimp Trawl", World Fishing, June, 2969, pages 60-62.

The long period of time span by these prior art efforts evidences the continuing nature of the problems associated with attempting to effectively classify or size-sort marine catches so as to improve the efficiency of fishing operations, reduce the amount of trawling sequences (and fuel required) in order to obtain a particular usable catch load, and prevent the needless entrapment and killing of large or small size fish or marine life.

Accordingly, the present invention is directed toward a unique approach for classifying marine items, particularly in relation to trawling operations, by segregating relatively larger sized and relatively smaller sized marine items from a flow of water and marine items, before this flow is entrapped within a marine catch container means such as the "cod-end" of trawling gear.

In accomplishing this objective, the present invention entails various independently significant method and apparatus aspects as follows:

While each aspect will be individually described in a method context, it will be recognized that the claims appended hereto present independently significant method facets of the invention, alone and in combination, as well as apparatus counterparts thereof.

In one aspect a method is presented for classifying marine items in an underwater environment which method utilizes
   floating vessel means;
   marine-catch container means having marine item receiving entrance means; and
   operating means interconnecting the floating vessel means and the marine-catch container means and operable, in response to movement of the floating vessel means, to induce marine-catch entrapping movement of the marine-catch container means.

This method is characterized by the improvement comprising:
   separating relatively smaller marine items under water from a flow of marine items and water entering the entrance means of the marine-catch container means; and
   discharging the separated, relatively smaller marine items generally transversely of the marine-catch container means prior to the flowing of the remainder of the marine items into the entrance of the marine catch container means;
   the separating and discharging of the relatively smaller marine items being generally operable to
      reduce the amount of marine items flowing toward the said marine-catch container means, and
      increase the average size of marine items flowing toward the marine-catch container means; and
   the separating of the relatively smaller marine items being operable to retain marine items, generally larger than the separated relatively smaller marine items, in the flow of marine items and water entering the entrance means.

Another method aspect entails the baffling of the flow of marine items and water flowing toward the marine-catch container means by
   providing baffle means positioned generally upstream of the entrance means of the marine-catch container means, with this baffle means being operable to reduce the flow rate of water entering the entrance means of the marine catch container means so as to increase the degree of dispersion of the marine-catch therewithin.

A further method aspect relates to the providing of multiple segment, flexible wall means yieldably impeding the flow of marine items and water into the marine-catch container means, with this flexible wall means providing
   a plurality of flexible and yieldable barriers extending generally longitudinally of the flow direction of said marine items flowing toward said marine-catch container means and operable to yieldably deflect, generally laterally outwardly upstream of the entrance means of the marine-catch container means, so as to permit discharging of said relatively smaller marine-catch items; and means operable to tend to equalize water pressure generally transversely across the flexible and yieldable barriers.

Still another method aspect pertains to providing expansion chamber means operable to permit the expansion of a flow of water containing marine items flowing toward the marine-catch container means, after the separating and discharging of the relatively smaller marine items. This expansion chamber means is operable to reduce the flow rate of water carrying the marine items; and reduce the flow pressure of water acting on the marine items after the separating of the relatively smaller marine items.

Yet another method aspect involves the separating of relatively larger marine items from a flow of marine items flowing generally towards the marine-catch container means, prior to the separating and discharging of the relatively smaller marine items, and the discharging of the separated generally larger marine items, generally laterally of the marine-catch container means. This separating and discharging of the relatively larger marine items is operable to reduce the number of items flowing toward the marine-catch container means, and decrease the average size of marine items flowing toward the marine-catch container means.

In a further method aspect, there are provided additional, multiple segment, flexible and yieldable wall means yieldably impeding the discharging of marine items and comprising a plurality of flexible and yieldable barriers extending generally longitudinally of the flow direction of marine items flowing toward the marine-catch container means and operable to yieldably deflect generally laterally outwardly to permit the discharge of the relatively larger marine items, and means operable to tend to equalize water pressure transversely across this plurality of flexible and yieldable barriers included in the additional wall means.

Moreover, a method aspect is contemplated wherein additional expansion chamber means are provided so as to be operable to permit the expansion of a flow of water containing marine items flowing toward the marine-catch container means, prior to the separation and discharge of the relatively larger marine items. This additional expansion chamber means is operable to reduce the flow of water carrying marine items, and reduce the flow of water acting on the marine items during the separating of the relatively larger marine items.

Another independently significant aspect of the invention involves the separating of relatively larger marine items from a flow of marine items flowing generally towards the marine-catch container means, and the discharging of such separated generally larger marine items generally transversely of the marine-catch container, means. In this aspect, this separating and discharging of said relatively larger marine items is operable to reduce the number of items flowing toward the marine-catch container means, and decrease the average size of marine items flowing toward the marine-catch container means.

Such separating is effected by flowing marine items toward a series of transversely extending, generally smooth, parallel, and straight rod surfaces which are operable to permit desired marine catch items to flow therebetween toward the marine-catch container means, and transversely deflect, without impedance, or gravitational deterrence, these relatively larger marine items.

These rod surfaces are substantially free of connecting surfaces on the upstream sides thereof and smoothly curve in a downstream direction at the outer extremeties thereof.

In the practice of this invention aspect, generally freely yieldable wall means serve to yieldably impede the discharging of marine items. Such wall means comprise generally freely yieldable barrier means extending generally longitudinally of the flow direction of marine items flowing toward the marine-catch container means and operable to yield generally outwardly to permit the discharging of the relatively larger marine items. The wall means is positioned inwardly of the outer extremeties of the generally smooth, parallel, and straight rod surfaces to permit generally free longitudinal flow of water on opposite sides of the wall means.

Having generally summarized independently significant aspects of the invention, it is now appropriate to describe prototype embodiments of the invention.

In thus describing the invention, reference will be made to appended drawings which illustrate, by way of example but not by way of limitation, two prototype embodiments of the invention, the first of which is presently preferred.

DRAWINGS

Presently preferred embodiments of the invention are illustrated in the accompanying drawings.

As shown in these drawings:

FIGS. 2-6 illustrate, in varying views, a first presently preferred prototype embodiment of the invention;

FIGS. 7-10 depict a second prototype embodiment;

DETAILED DESCRIPTION OF EMBODIMENTS

The following discussion will proceed with an initial description of the overall apparatus in the context of a trawling operation, followed by detailed descriptions of two prototype embodiments, the first of which is presently preferred.

Thereafter, various independently significant aspects of the invention will be reviewed in combination, in a format employing claim-type language.

Overall Apparatus.

Figure 1:
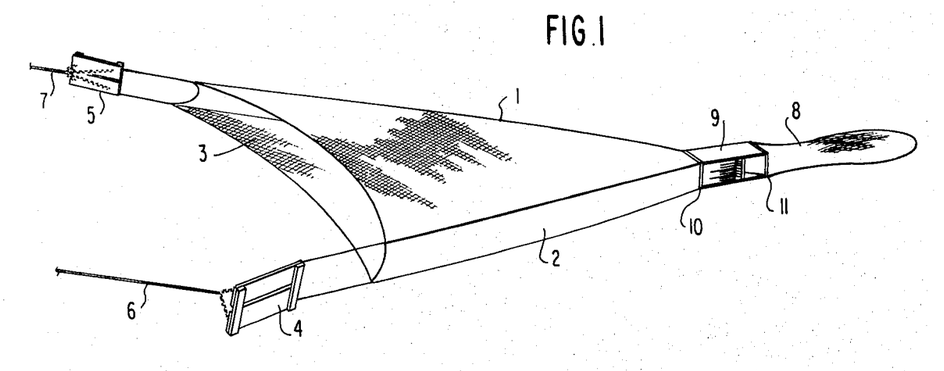
FIG. 1 schematically illustrates a conventional trawling gear, improved by the incorporation of the present invention.

FIG. 1 schematically depicts a conventional trawling apparatus 1.

Trawling apparatus 1 comprises a trawling net 2, the mouth 3 of which is held in an open, marine life receiving position by a pair of laterally spaced "wings" or "otter doors" 4 and 5. A weighted lower line and a buoyant upper line normally extends across the bottom and top respectively, of inlet or mouth 3 to maintain its vertically open condition during trawling. Tow lines 6 and 7 extend from "otter doors" 4 and 5 to a floating trawling vessel. The outer or aft end of trawling gear 1 is provided with a marine-catch container 8, conventionally termed a "cod-end".

A marine item classifying device 9 of the pesent invention is incorporated between the main net 2 and the catch container 8 and provides a marine item classifying, flow path leading from the outlet 10 of the main net 2 into the inlet portion 11 of the marine-catch container 8.

The floating trawler connected with the tow line 6 and 7 would, when under way, exert a pulling force on the gear 1. As is well recognized in the art, this pulling force will laterally spread the otter boards 4 and 5 so as to maintain the trawling mouth 3 in an open condition and cause marine items in the path of the forward moving mouth 3 to enter the net 2, pass through the classifier 9, and ultimately be contained within the container 8. When sufficient tension is observed to be acting on the trawling lines 6 and 7, the trawler will retrieve the gear 1, and discharge the classified catch, of desired intermediate sized items, into a desired storage or handling facility.

Representative trawling gear of the type under consideration is depicted, for example, in U.S. Obee Pat. No. 852,135, U.S. Newman et al Pat. No. 3,777,388, and U.S. Newman Pat. No. 3,651,595.

First, Presently Preferred, Embodiment

FIGS. 2-6 illustrate structural details of a presently preferred embodiment 100 of the marine classifier 9 of the present invention.

Structure 100, as shown in FIGS. 2-6, includes upper and lower relatively rigid wall means 101 and 102, each having a generally rectangular configuration, elongate in the direction of trawling. At the leading end or entrance 103 of apparatus 100 the net 2 may be detachably secured to the entrance 103 via a series of outwardly projecting pins or pegs 104 which serve to intersect mesh openings in the net 2. With the net mesh thus connected with the pins 104, apertured securing strips 105 may be bolted, screwed or otherwise fastened down to the rigid framing of the mouth 103 so as to secure the trawling gear 102.

A similar securing arrangement may be employed at the exit end 106 of apparatus 100 to detachably secure the marine item containing mesh or net bag 8 to the apparatus 9.

Figure 2:
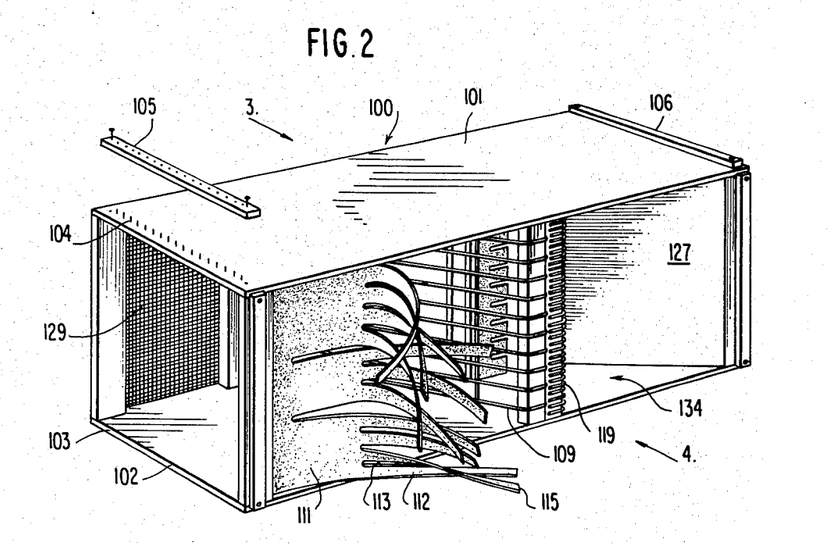
FIG. 2 provides a perspective view of the presently preferred, first prototype embodiment, separated from the overall trawling gear depicted in FIG. 1.
Figure 3:
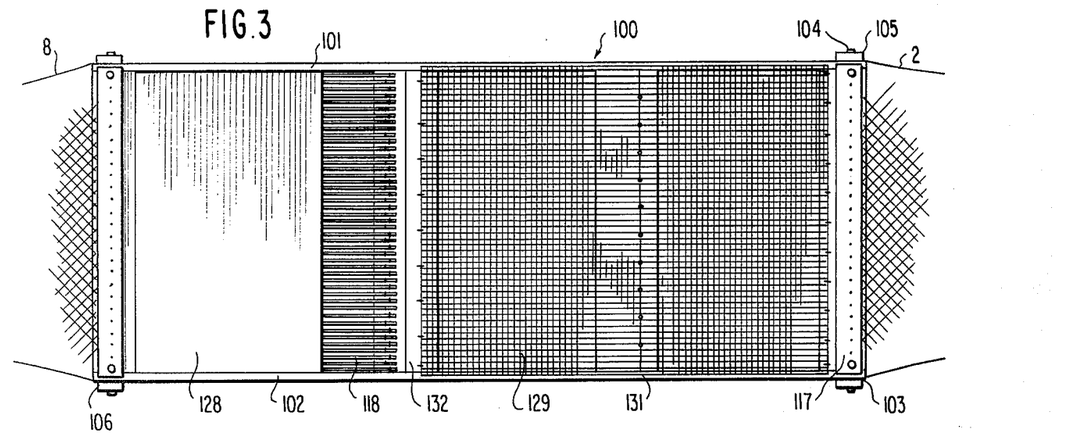
FIG. 3 provides a side elevational view of the FIG. 2 apparatus, as viewed generally along the view direction 3, depicted in FIG. 2.

The flow of water and marine items entering mouth or entrance 103 will first encounter an inclined grid like structure 107, inclined rearwardly and laterally of the side 108 of structure 100. Grid 107 is fabricated, as shown in FIG. 2 from a series of vertically spaced rods or wirelike members which are smoothly curved around a securing bar 108 so as to insure that no item movement impeding obstructions are present on the leading face 109 of the grid 107. Rearwardly located transversely extending reinforcing bars 110 may be provided in association with grid 107 as shown in FIG. 5.

Figure 5:
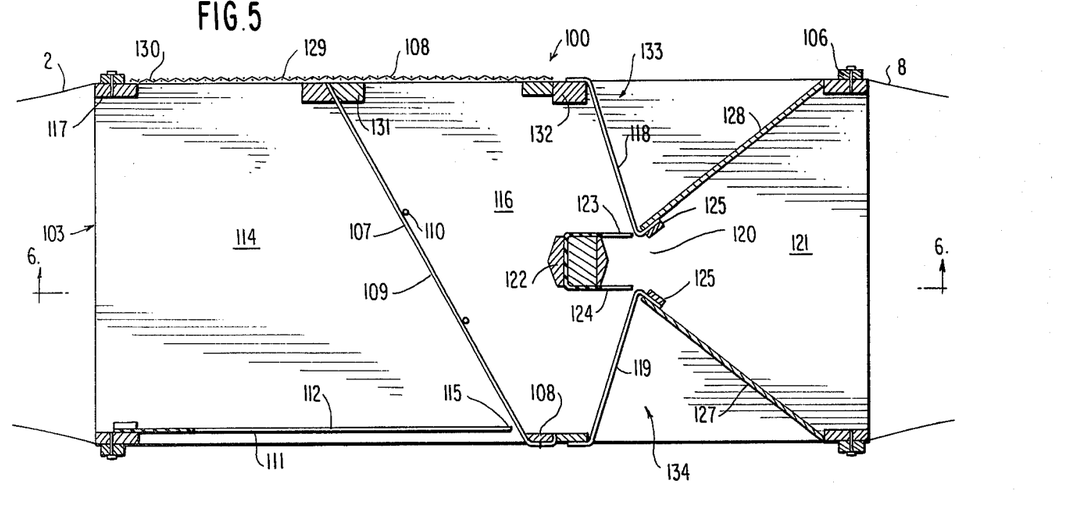
FIG. 5 provides a transverse sectional view of the FIG. 2 apparatus, as viewed generally along section line 5—5 of FIG. 4.
Figure 6:
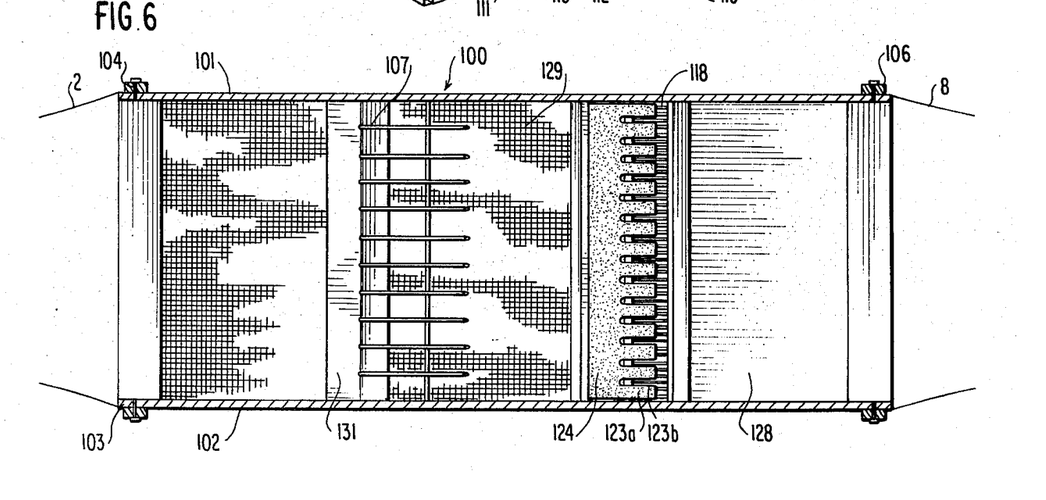
FIG. 6 provides a transverse sectional view of the FIG. 2 apparatus as viewed generally along section line 6—6 of FIG. 5.
Figure 7:
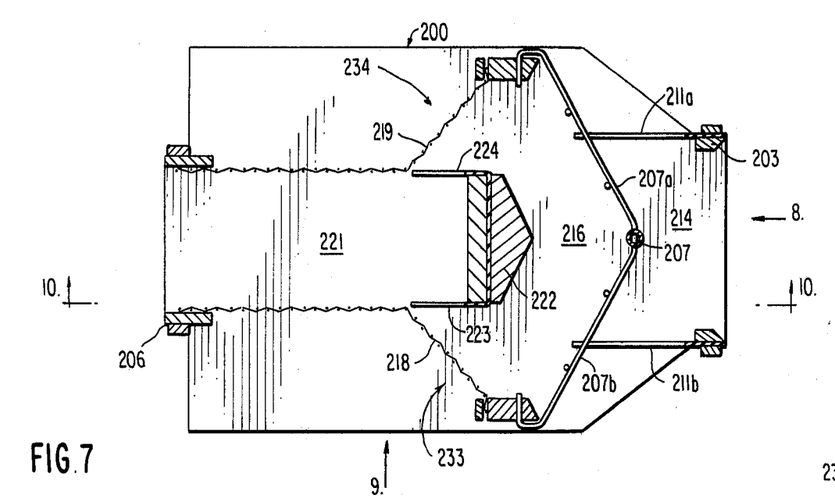
FIG. 7 provides a generally plan, sectional view of the second embodiment, viewed generally along section line 7—7 of FIG. 8.
Figures 8, 9:
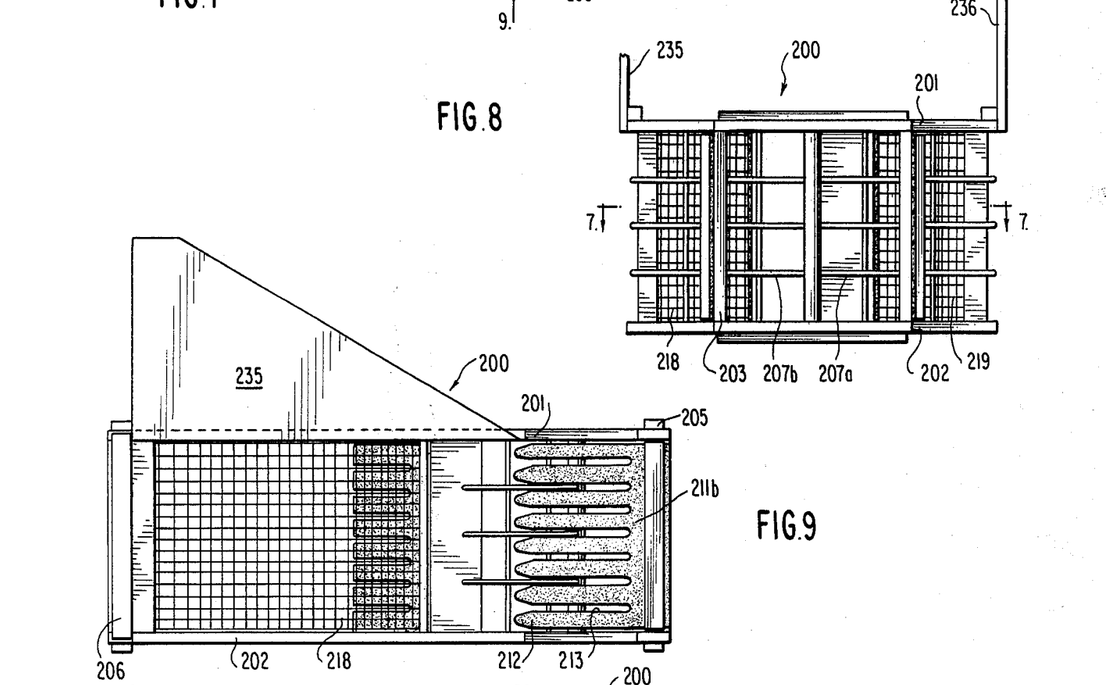
FIG. 8 provides an in elevational view of the FIG. 7-10 apparatus, viewed generally from view direction 8 of FIG. 7.
FIG. 9 provides a side elevational view of the FIG. 7-10 apparatus, viewed generally along view direction 9 of FIG. 7.
Figure 10:
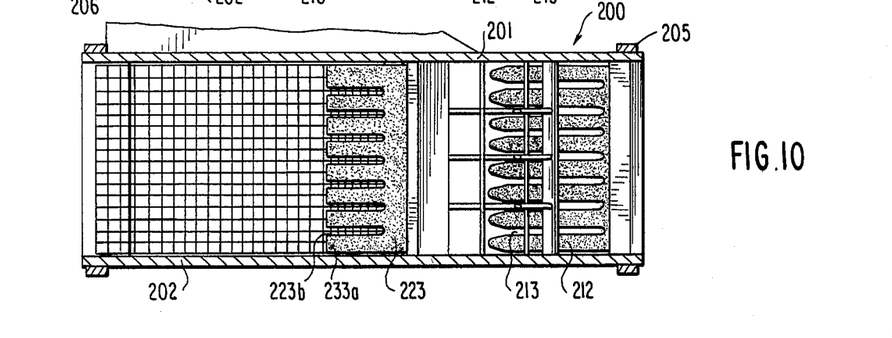
FIG. 10 provides a longitudinally transverse sectional view of the FIG. 7-10 apparatus, as viewed along section line 10—10 of FIG. 7.

A sheet like, yieldable barrier member 111 made of rubber, belting, etc. and providing a plurality of vertically spaced flexible fingers 112, separated by longitudinally extending gaps 113, yieldably closes the entrance chamber 114 on the port side of the apparatus as shown in FIGS. 2 and 5. As illustrated, fingers 112 terminate in free ends 115 which are located somewhat inboard of the lateral periphery of the grid 107.

At present, it is believed desirable for the free ends 115 of laterally flexible barrier strips 112 terminate somewhat inboard of the inner most wall of framing 108 so as to permit a flow of water longitudinally of the apparatus, across both sides of the barrier means 111 into an intermediate zone 116 of the apparatus. It is believed that this flow arrangement will tend to promote the positional stability of the fingers 112, tending them, in response to trawling movement, to stabilize in a position extending longitudinally of the side wall of the apparatus 100, as generally shown in FIG. 5.

Moreover, the presence of the longitudinally extending gaps 113 will tend to equalize pressure across the fingers 112 so as to further stabilize their normal or nuetral positions, generally illustrated in FIG. 5.

As will be noted in FIG. 5, the framing 117 of the entrance 103 provides a reduced size entrance, so that the chamber 114, aft of the entrance framing 117, consitutes an enlarged, or expansion chamber.

Continuing rearwardly through the apparatus embodiment 100, it will be noted that the rear end of the intermediate chamber 116 is laterally bridged by grid structures 118 and 119. As shown in FIGS. 2 and 5, grid structures 118 and 119 comprise generally vertically spaced, horizontally extending grid rods or wires extending laterally inwardly from the sides of the apparatus 100 and generally rearwardly, in an inclined manner, toward an entrance mouth 120 leading into the rear chamber 121 of the apparatus.

A baffle bar, comprising a generally vertically extending baffle post 122, is positioned somewhat forward of the mouth 120.

Figure 4:
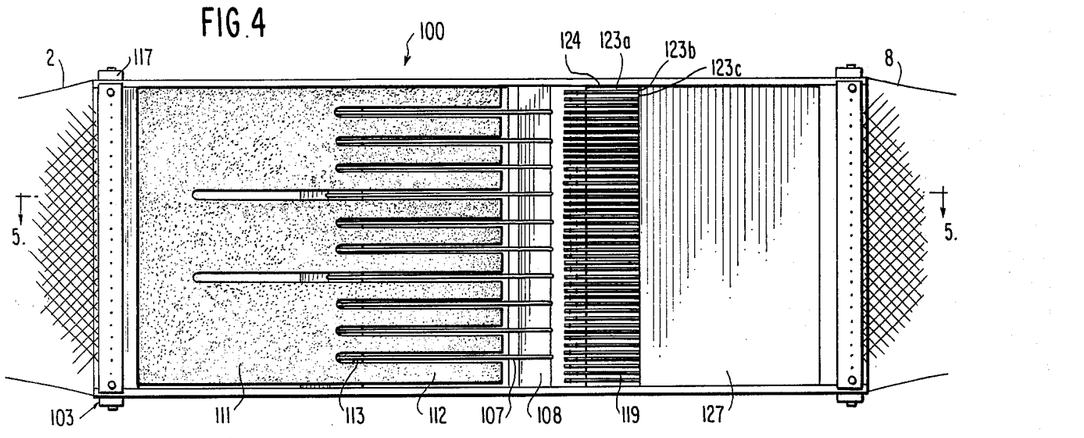
FIG. 4 provides a side elevational view of the FIG. 2 apparatus as viewed generally along the view direction 4 depicted in FIG. 2, with flexible strip-like barrier means being oriented in the generally upright configuration which would be assumed during underwater operations (FIG. 2, for purposes of clarity and presentation of internal details, shows these strip-like barriers-possibly fabricated from belting, rubber, etc.-flexed away from internal grid means which serve to separate and discharge relatively larger marine items)

In one form of the invention, the baffle 122 may support laterally flexible barrier means 123 and 124 extending longitudinally along each side of the baffle 122. Such flexible means 123 and 124, as schematically depicted in FIG. 4 with reference to barrier 124, may comprise, as in the case of yieldable barrier 111, a series of longitudinally extending flexible strips 123a, vertically separated by gaps 123b, and terminating in free ends 123c generally adjacent the mouth 120.

The innermost extremities of the rods defining grids 118 and 119 may be secured to vertically extending framing means 125 and 126, as generally illustrated in FIG. 5.

Vertically extending, rearwardly and laterally diverging wall means 127 and 128 extend from grid securing framing 125 and 126 to the exit 106 of the apparatus 100, as illustrated in FIG. 5, so as to define an expanding character for chamber 121 extending rearwardly of the entrance mouth 120.

The starboard side 129 of the apparatus 100 may be provided with a wire mesh wall means 130 extending from framing 117 rearwardly past vertical framing means 131, which supports grid 107, to vertical framing means 132 which supports the outer end of the rods of grid 118.

With the apparatus 100 now having been described in detail, the manner in which this appratus effects efficient classification of marine items during a trawling operation will be self apparent.

The flow of marine items, comprising a desired intermediate size catch such as shrimp, undesired trash, undesired large fish, and undesired small marine life such as small shrimp, will enter the net mouth 3 and be funneled into the classifier entrance area 103. This flow of water and marine items will continue longitudinally rearwardly until the flow engages separating grid 107. The relatively large vertical spacings between the rods of grid 107 will permit the intermediate and smaller size items in the catch to flow into the intermediate chamber 116 but will deflect the undesired larger items toward the flexible barrier 111. The fingers 112 of barrier 111 will tend to retain smaller and the desired intermediate size marine items but will flex laterally outwardly to easily permit the lateral discharge of the thus separated and undesired relatively larger marine items and avoid excessively damaging the remainder of the catch. However, the water flowing past these fingers on opposite sides thereof will tend to stabilize them in the illustrated barrier position so as to promote the classifying action of grid 107. In extending outwardly beyond fingers 112, grid 107 will extend this classifying action.

The expansion of the flow aft of mouth area 117 will tend to reduce the flow pressure acting on marine items during this separation to prevent "bunching up" or clogging of the grid 110 and increase the degree of dispersion of marine items during this separation of relatively larger items. This expansion is also believed to prevent a "funnelling" effect which would overpressure zone 114 and force barrier 112 outwardly.

Marine items flowing rearwardly through intermediate chamber 116 will encounter grids 118 and 119 which have a relatively smaller vertical spacing between the rods thereof. This grid arrangement will tend to permit undesired, relatively small items such as small shrimp to escape through the grids to the exterior of the apparatus through the lateral openings 133 and 134. The desired intermediate sized items, such as marketable shrimp, will be readily deflected by the grid rods 118 and 119, without excessive damage, toward the flexible barrier means 123 and 124. These intermediate size items will be urged against the flexible barrier means 123 and 124, deflect the fingers 123a thereof inwardly, and permit the intermediate size items to flow into the expansion chamber 121 at the rear of the apparatus. Expansion of the flow of desired intermediate sized items in chamber 121 will tend to improve the dispersion of items desired to be retained in the container means 8 and prevent undesired bunching, crushing and clogging within the container 8.

As will be apparent, the flexible wall means 111, 123 and 124 function as yieldable barriers or outlets, tending to insure that the catch is properly classified by the size segregating grid means 107, 118 and 119. In certain instances, such barriers may not be required or may take other forms, such as hinged unitary panes, etc.

Second Embodiment

The second embodiment 200 is schematically illustrated in FIGS. 7–10.

The main components of embodiment 200 are generally functionally the same as the mechanisms heretofore described in connection with the first embodiment 100. Accordingly, reference numerals for similar structural elements have been assigned to the elements of the embodiment 200 corresponding to the same reference numerals employed in connection with the first embodiment 100, but increased by 100.

As will be noted, the relatively large item separation zone 221 of apparatus 200 is symetrical in character as opposed to the assemetric arrangement described in connection with the apparatus 100. Thus, the large item separating grid means 207 has a generally rearwardly extending V-shaped cross section, with flexible barrier means 207a and 207b and multiple finger, flexible barriers 211a and 211b being associated with opposite apparatus sides.

Moreover, the relatively small items separating grids 218 and 219 incorporated in apparatus 200 is fabricated from wire meshing, as opposed to the spaced rod arrangement featured in connection with apparatus 100. (The latter spaced parallel rod arrangement is believed preferable since it involves no cross member to catch or impede movement of marine items.)

In addition, it will be noted that this meshing is extended longitudinally rearward to exit 206 to define an exit chamber 221 which, by virtue of its perforate nature, accomates flow expansion.

As will be further noted, the upper wall portion 201 of apparatus 200 is provided with a pair of laterally spaced stabilizing fins 235 and 236, the function of which is to tend to prevent or reduce unstable rolling movement and stabilize the apparatus 200 in the preferable upright configuration shown in the drawings.

The mode of separation of marine items passing through apparatus 200 is substantially the same as the mode of separation described in connection with the first embodiment 100.

Corrolation of Claim Language with Structural Description

By way of facilitating an overall evaluation of the significance of claim language, the following presentation sets forth the overall apparatus combination, which combines separately significant invention facets, in claim language format.

The apparatus (100 or 200) includes means 107 or 207 for separating relatively larger marine items from a flow of marine items flowing generally towards the marine-catch container means (8), prior to the separating and discharging of the relatively smaller marine items, and discharging separated generally larger marine items generally laterally of the marine-catch container means 8. This separating and discharging of relatively larger marine items is operable to reduce the number of items flowing toward the marine-catch container means (8), and decrease the average size of marine items flowing toward this marine-catch container means (8).

The apparatus (100 or 200) may also include multiple, segment, flexible and yieldable wall means (111 or 211a, 211b) yieldably impeding the discharging of marine items and comprising a plurality of first flexible and yieldable barriers (112 or 212) extending generally longitudinally of the flow direction of marine items flowing toward the marine-catch container means (8) and operable to yieldably deflect generally laterally outwardly to permit the discharging of the relatively larger marine items, and first means (113 or 213) operable to tend to equalize water pressure transversely across this first flexible and yieldable barriers.

Further, the apparatus (100 or 200) may incorporate first expansion chamber means (121 or 221) operable to permit an expansion of a flow of water containing marine items flowing toward the marine-catch container means, prior to the separating and discharging of the relatively larger marine items. This first expansion chamber means (121 or 221) is operable to reduce the flow rate of water carrying marine items; and reduce the flow pressure of water acting on marine items during the separating of the relatively larger marine items.

In addition, the apparatus (100 or 200) may include means (118/119 or 218/219) for separating relatively smaller marine items under water from a flow of marine items and water entering the entrance means (11) of the marine-catch container means and means (133/134 or 233/234) for discharging the separated relatively smaller marine items generally transversely of the marine-catch container means (8) prior to the flowing of the remainder of the marine items into the entrance 11 of the marine catch container means. Such means for separating and discharging relatively smaller marine items are generally operable to reduce the amount of marine items flowing toward the marine-catch container means (8), and increase the average size of marine items flowing toward the marine-catch container means (8).

The means (118/119 or 218/219) for separating the relatively smaller marine items is operable to retain marine items, generally larger than the separated relatively smaller marine items, in the flow of marine items and water entering the entrance means (11).

Also preferably included in the apparatus (100 or 200) may be means (122 or 222) for baffling the flow of marne items and water flowing toward the marine-catch container means 8. Such baffle means (122 or 222) may be positioned generally upstream of the entrance means (11) of the marine-catch container means (8), with this baffle means being operable to reduce the flow rate of water entering the entrance means of the marine catch container means so as to increase the degree of dispersion of the marine-catch therewithin.

As noted, the apparatus (100 or 200) may include additional multiple segment, flexible wall means (123/124 or 223/224) yieldably impeding the flow of marine items and water into the marine-catch container means, with such additional flexible wall means including a plurality of second flexible and yieldable barriers (123a or 223a) extending generally longitudinally of the flow direction of marine items flowing toward the marine-catch container means (8(and operable to yieldably deflect, generally laterally outwardly upstream of the entrance means of said marine-catch container means so as to permit discharging of the relatively smaller marine-catch items, and second means (123b or 223b) operable to tend to equalize water pressure generally transversely across the second flexible and yieldable barriers.

The apparatus (100 or 200) may further comprise second expansion chamber means (121 or 221) operable to permit the expansion of a flow of water containing marine items flowing toward the marine-catch container means, after the separating and discharging of the relatively smaller marine items. This second expansion chamber means (121 or 221) is operable to reduce the flow rate of water carrying marine items; and reduce the flow pressure of water acting on marine items after the separating of relatively smaller marine items.

In the presently preferred embodiment (100), the means (107 and 111) for separating relatively larger marine items from a flow of marine items flowing generally toward the marine-catch container means (8) and discharging such separated generally larger marine items generally transversely of this marine-catch container means is operable to reduce the number of items flowing toward the marine-catch container means (8), and decrease the average size of marine items flowing toward this marine-catch container means.

Such means (107 and 111) for separating and discharging of relatively larger marine items includes a series of transversely extending, generally smooth, parallel and straight rod surfaces (109) operable to permit desired marine catch items to flow therebetween toward the marine-catch container means, and transversely deflect, without impedance or gravitational deterrence, the relatively larger marine items.

These rod surfaces 109 are substantially free of connecting surfaces on the upstream sides thereof and smoothly curve in a downstream direction at the outer extremeties thereof around framing (108).

In this embodiment, the generally freely yieldable wall means (111) yieldably impedes the discharging of marine items and comprises generally freely yieldable barrier means (111) extending generally longitudinally of the flow direction of marine items flowing toward the marine-catch container means (8) and operable to yield generally outwardly to permit the discharging of the relatively larger marine items. This wall means (111) is positioned inwardly of the outer extremeties of the generally smooth, parallel and straight rod surfaces (109) to permit a generally free, longitudinal flow of water on opposite sides of the wall means.

SUMMARY OF MAJOR ADVANTAGES, UNOBVIOUSNESS, AND SCOPE OF INVENTION

As will be appreciated, the present invention comprises a structurally uncomplicated modification of conventional trawling gear which may be readily incorporated in trawling gear and serve to reliably separate both undesired small and undesired large items from a desired intermediate sized catch.

The various baffle and expansion chamber means serve to provide a desired dispersion of marine items so as to tend to prevent clogging of the various separation grids or bunching, clogging and bruising of the finally separated intermediated sized items as they flow into the container bag 8.

The yieldable, flexible finger, barrier means provide a yieldable urging of the flow of marine items into size segragating engagement with the classifying grids, with the desired positioning of these fingers being stabilized as a result of the passage of the apparatus underwater as trawling proceeds.

The smooth, straight, rod grid of the preferred embodiment, which serves to separate undesired large items, is believed to be particularly desirable in that it is free of mechanical impediment or gravitational deterrance to the discharging movement of large items. The free, longitudinal flow of water along opposite sides of the associated yieldable wall means, due to this wall means being inset from the outer grid extremity, is believed to desirably cause water flow to tend to yieldably stabilize the wall means in this illustrated, longitudinally extending position, serving to promote the separation action of the apparatus.

In a combined sense, these advantages yield a much improved catch, substantially confined to the size of the items desired to be retained and marketed, and tends to prevent undesired crushing and bruising of the retained catch or damage resulting therefrom.

Such optimized classifying of marine catches serves many purposes.

When the marine item container 8 is ascertained as being full, in response to detection of pull loads acting on the trawling gear, the catch may be retrieved without having a substantial percentage of the catch being wasted because it includes undesired excessively large or excessively small items. In addition, the trawling gear will not have to be hauled as many times in order to obtain a completed cargo of acceptably sized marine items such as shrimp, fish, etc.

In reducing the number of time the trawling gear is required to be retrieved so as to obtain a desired catch level, fuel requirements of the trawling operation will be substantially reduced.

By segregating large size fish or marine life and small size marine life from the desired catch, unnecessary and wasteful killing of marine life will be able to be effectively avoided or reduced.

While the invention has been described in the context of presently preferred prototype embodiments, it will be apparent that the invention presented is broad based in nature and not limited to the specific structural configurations, arrangements, or sequences heretofore described.

Moreover, it will be appreciated that the invention may be practiced in the context of individually significant aspects in accordance with the claims presented in this application and that significant advantages are derivable by utilizing some of these individual aspects without others necessarily being present.

While the prior art patents and publications set forth at the outset of this disclosure feature a variety of approaches to the handling or classifying of marine items, the structural and operational concepts set forth in these prior art disclosures, in not suggesting the aspects of this invention considered to be of individual significance, would not suggest the present invention and would tend to lead those in the art away from these aspects.

Accordingly, it is to be concluded that the prior art, in not suggesting or pointing toward the presently presented invention, evidences the unobviousness of this invention.

Those skilled in the fishing and trawling art and familiar with the present disclosure may well envision additions, deletions, substitutions, equivalents, and other modifications which would fall within the invention of the purview as claimed.

The embodiments of the invention in which an exclusive property or privilege is claimed are defined as follows:

1. A method of classifying marine items in an underwater environment,
    said method utilizing
        floating vessel means;
        marine-catch container means having marine item receiving entrance means; and
        operating means interconnecting said floating vessel means and said marine-catch container means and operable, in response to movement of said floating vessel means, to induce marine-catch entrapping movement of said marine-catch container means,
    said method being characterized by the improvement comprising:
        separating relatively smaller marine items under water from a flow of marine items and water entering said entrance means of said marine-catch container means;
        discharging said separated, relatively smaller marine items generally laterally of said marine-catch container means prior to the flowing of the remainder of said marine items into the entrance of said marine-catch container means;
        said separating and discharging of said relatively smaller marine items being generally operable to
            reduce the amount of marine items flowing toward said marine-catch container means, and
            increase the average size of marine items flowing toward said marine-catch container means;
        said separating of said relatively smaller marine items being operable to retain marine items, generally larger than said separated relatively smaller marine items, in said flow of marine items and water entering said entrance means; and baffling the flow of marine items and water flowing toward said marine-catch container means by providing baffle means positioned generally upstream of the entrance means of said marine-catch container means, with said baffle means being operable to reduce the flow rate of water entering said entrance means of said marine catch container means so as to increase the degree of dispersion of said marine-catch therewithin.

2. A method of classifying marine items in an underwater environment,
said method utilizing
floating vessel means;
marine-catch container means having marine item receiving entrance means; and
operating means interconnecting said floating vessel means and said marine-catch container means and operable, in response to movement of said floating vessel means, to induce marine-catch entrapping movement of said marine-catch container means,
said method being characterized by the improvement comprising:
separating relatively smaller marine items under water from a flow of marine items and water entering said entrance means of said marine-catch container means;
discharging said separated, relatively smaller marine items generally laterally of said marine-catch container means prior to the flowing of the remainder of said marine items into the entrance of said marine-catch container means;
said separating and discharging of said relatively smaller marine items being generally operable to reduce the amount of marine items flowing toward said marine-catch container means, and
increase the average size of marine items flowing toward said marine-catch container means;
said separating of said relatively smaller marine items being operable to retain marine items, generally larger than said separated relatively smaller marine items, in said flow of marine items and water entering said entrance means; and
providing multiple segment, flexible wall means yieldably impeding the flow of marine items and water into said marine-catch container means, with said flexible wall means providing
a plurality of flexible and yieldable barriers extending generally longitudinally of the flow direction of said marine items flowing toward said marine-catch container means and operable to yieldably deflect, generally laterally outwardly upstream of the entrance means of said marine-catch container means, so as to permit discharging of said relatively smaller marine-catch items; and
means operable to tend to equalize water pressure generally transversely across said flexible and yieldable barriers.

3. A method of classifying marine items in an underwater environment,
said method utilizing
floating vessel means;
marine-catch container means having marine item receiving entrance means; and operating means interconnecting said floating vessel means and said marine-catch container means and operable, in response to movement of said floating vessel means, to induce marine-catch entrapping movement of said marine-catch container means,
said method being characterized by the improvement comprising:
separating relatively smaller marine items under water from a flow of marine items and water entering said entrance means of said marine-catch container means;
discharging said separated, relatively smaller marine items generally laterally of said marine-catch container means prior to the flowing of the remainder of said marine items into the entrance of said marine-catch container means;
said separating and discharging of said relatively smaller marine items being generally operable to reduce the amount of marine items flowing toward said marine-catch container means, and
increase the average size of marine items flowing toward said marine-catch container means;
said separating of said relatively smaller marine items being operable to retain marine items, generally larger than said separated relatively smaller marine items, in said flow of marine items and water entering said entrance means; and
providing expansion chamber means operable to permit the expansion of a flow of water containing marine items flowing toward said marine-catch container means, after said separating and discharging of said relatively smaller marine items;
said expansion chamber means being operable to reduce the flow rate of water carrying said marine items, and reduce the flow pressure of water acting on said marine items after said separating of said relatively smaller marine items.

4. A method of classifying marine items in an underwater environment,
said method utilizing
floating vessel means;
marine-catch container means having marine item receiving entrance means; and
operating means interconnecting said floating vessel means and said marine-catch container means and operable, in response to movement of said floating vessel means, to induce marine-catch entrapping movement of said marine-catch container means,
said method being characterized by the improvement comprising:
separating relatively smaller marine items under water from a flow of marine items and water entering said entrance means of said marine-catch container means;
discharging said separated, relatively smaller marine items generally laterally of said marine-catch container means prior to the flowing of the remainder of said marine items into the entrance of said marine-catch container means;
said separating and discharging of said relatively smaller marine items being generally operable to reduce the amount of marine items flowing toward said marine-catch container means, and
increase the average size of marine items flowing toward said marine-catch container means;

said separating of said relatively smaller marine items being operable to retain marine items, generally larger than said separated relatively smaller marine items, in said flow of marine items and water entering said entrance means; and separating relatively larger marine items from a flow of marine items flowing generally towards said marine-catch container means, prior to said separating and discharging of said relatively smaller marine items, and discharging said separated generally larger marine items generally laterally of said marine-catch container means;

said separating and discharging of said relatively larger marine items being operable to reduce the number of items flowing toward said marine-catch container means, and decrease the average size of marine items flowing toward said marine-catch container means.

5. A method as described in claim 4 and further characterized by:

providing additional, multiple segment, flexible and yieldable wall means yieldably impeding the discharging of marine items and comprising a plurality of flexible and yieldable barriers extending generally longitudinally of the flow direction of marine items flowing toward said marine-catch container means and operable to yieldably deflect generally laterally outwardly to permit said discharging of said relatively larger marine items, and means operable to tend to equalize water pressure transversely across said plurality of flexible and yieldable barriers included in said additional wall means.

6. A method as described in claim 4 and further characterized by:

providing additional expansion chamber means operable to permit the expansion of a flow of water containing marine items flowing toward said marine-catch container means, prior to said separating and discharging of said relatively larger marine items;

said additional expansion chamber means being operable to reduce the flow rate of water carrying marine items, and reduce the flow pressure of water acting on said marine items during said separating of said relatively larger marine items.

7. A method of classifying marine items in an underwater environment, said method utilizing floating vessel means;

marine-catch container means having marine item receiving entrance means; and operating means interconnecting said floating vessel means and said marine-catch container means and operable, in response to movement of said floating vessel means, to induce marine-catch entrapping movement of said marine-catch container means, said method being characterized by the improvement comprising:

separating relatively larger marine items from a flow of marine items flowing generally towards said marine-catch container means, and discharging said separated generally larger marine items generally laterally of said marine-catch container means;

said separating and discharging of said relatively larger marine items being operable to reduce the number of items flowing toward said marine-catch container means, and decrease the average size of marine items flowing toward said marine-catch container means;

providing multiple segment, flexible and yieldable wall means yieldably impeding the discharging of marine items and comprising a plurality of flexible and yieldable barriers extending generally longitudinally of the flow direction of marine items flowing toward said marine-catch container means and operable to yieldably deflect generally laterally outwardly to permit said discharging of said relatively larger marine items, and means operable to tend to equalize water pressure transversely across said plurality of flexible and yieldable barriers included in said additional wall means; and providing expansion chamber means operable to permit the expansion of a flow of water containing marine items flowing toward said marine-catch container means, prior to said separating and discharging of said relatively larger marine items;

said expansion chamber means being operable to reduce the flow rate of water carrying marine items; and reduce the flow pressure of water acting on said marine items during said separating of said relatively larger marine items.

8. A method of classifying marine items in an underwater environment, said method utilizing floating vessel means;

marine-catch container means having marine item receiving entrance means; and operating means interconnecting said floating vessel means and said marine-catch container means and operable, in response to movement of said floating vessel means, to induce marine-catch entrapping movement of said marine-catch container means, said method being characterized by the improvement comprising:

separating relatively smaller marine items under water from a flow of marine items and water entering said entrance means of said marine-catch container means; and discharging said separated, relatively smaller marine items generally transversely laterally of said marine-catch container means prior to the flowing of the remainder of said marine items into the entrance of said marine-catch container means;

said separating and discharging of said relatively smaller marine items being generally operable to reduce the amount of marine items flowing toward said marine-catch container means, and increase the average size of marine items flowing toward said marine-catch container means; and said separating of said relatively smaller marine items being operable to retain marine items, generally larger than said separated relatively smaller marine items, in said flow of marine items and water entering said entrance means;

baffling the flow of marine items and water flowing toward said marine-catch container means by providing baffle means positioned generally upstream of the entrance means of said marine-catch container means, with said baffle means being operable to reduce the flow rate of water entering said entrance means of said marine catch container means so as to increase the degree of dispersion of said marine-catch therewithin;

providing multiple segment, flexible wall means yieldably impeding the flow of marine items and water into said marine-catch container means, with said flexible wall means providing a plurality of flexible and yieldable barriers extending generally longitudinally of the flow direction of said marine items flowing toward said marine-catch container means and operable to yieldably deflect, generally laterally outwardly upstream of the entrance means of said marine-catch container means, so as to permit discharging of said relatively smaller marine-catch items, and means operable to tend to equalize water pressure generally transversely across said flexible and yieldable barriers; and providing expansion chamber means operable to permit the expansion of a flow of water containing marine items flowing toward said marine-catch container means, after said separating and discharging of said relatively smaller marine items;

said expansion chamber means being operable to reduce the flow rate of water carrying said marine items; and reduce the flow pressure of water acting on said marine items after said separating of said relatively smaller marine items.

9. A method of classifying marine items in an underwater environment, said method utilizing floating vessel means;

marine-catch container means having marine item receiving entrance means; and operating means interconnecting said floating vessel means and said marine-catch container means and operable, in response to movement of said floating vessel means, to induce marine-catch entrapping movement of said marine-catch container means, said method being characterized by the improvement comprising:

separating relatively larger marine items from a flow of marine items flowing generally towards said marine-catch container means, prior to said separating and discharging of said relatively smaller marine items, and discharging said separated generally larger marine items generally laterally of said marine-catch container means;

said separating and discharging of said relatively larger marine items being operable to reduce the number of items flowing toward said marine-catch container means, and decrease the average size of marine items flowing toward said marine-catch container means;

providing additional, multiple segment, flexible and yieldable wall means yieldably impeding the discharging of marine items and comprising a plurality of first flexible and yieldable barriers extending generally longitudinally of the flow direction of marine items flowing toward said marine-catch container means and operable to yieldably deflect generally laterally outwardly to permit said discharging of said relatively larger marine items, and first means operable to tend to equalize water pressure transversely across said first flexible and yieldable barriers included in said additional wall means;

providing first expansion chamber means operable to permit the expansion of a flow of water containing marine items flowing toward said marine-catch container means, prior to said separating and discharging of said relatively larger marine items;

said first expansion chamber means being operable to reduce the flow rate of water carrying marine items, and reduce the flow pressure of water acting on said marine items during said separating of said relatively larger marine items;

separating relatively smaller marine items under water from a flow of marine items and water entering said entrance means of said marine-catch container means; and discharging said separated, relatively smaller marine items generally transversely of said marine-catch container means prior to the flowing of the remainder of said marine items into the entrance of said marine-catch container means;

said separating and discharging of said relatively smaller marine items being generally operable to reduce the amount of marine items flowing toward said marine-catch container means, and increase the average size of marine items flowing toward said marine-catch container means; and said separating of said relatively smaller marine items being operable to retain marine items, generally larger than said separated relatively smaller marine items, in said flow of marine items and water entering said entrance means;

baffling the flow of marine items and water flowing toward said marine-catch container means by providing baffle means positioned generally upstream of the entrance means of said marine-catch container means, with said baffle means being operable to reduce the flow rate of water entering said entrance means of said marine catch container means so as to increase the degree of dispersion of said marine-catch therewithin; and providing additional multiple segment, flexible wall means yieldably impeding the flow of marine items and water into said marine-catch container means, with said additional flexible wall means providing a plurality of second flexible and yieldable barriers extending generally longitudinally of the flow direction of said marine items flowing toward said marine-catch container means and operable to yieldably deflect, generally laterally outwardly upstream of the entrance means of said marine-catch container means, so as to permit discharging of said relatively smaller marine-catch items, and second means operable to tend to equalize water pressure generally transversely across said second flexible and yieldable barriers; and providing second expansion chamber means operable to permit the expansion of a flow of water containing marine itmes flowing toward said marine-catch container means, after said separating and discharging of said relatively smaller marine items;

said second expansion chamber means being operable to reduce the flow rate of water carrying said marine items, and reduce the flow pressure of water acting on said marine items after said separating of said relatively smaller marine items.

10. Apparatus for classifying marine items in an underwater environment, to be used with floating vessel means;

marine-catch container means having marine item receiving entrance means; and operating means interconnecting said floating vessel means and said marine-catch container means and operable, in response to movement of said floating vessel means, to induce marine-catch entrapping movement of said marine-catch container means, said apparatus being characterized by the improvement comprising: p1 means for separating relatively smaller marine items under water from a flow of marine items and water entering said entrance means of said marine-catch container means;

means for discharging said separated, relatively smaller marine items generally transversely of said marine-catch container means prior to the flowing of the remainder of said marine items into the entrance of said marine-catch container means;

said means for separating and discharging said relatively smaller marine items being generally operable to reduce the amount of marine items flowing toward said marine-catch container means, and increase the average size of marine items flowing toward said marine-catch container means; and said means for separating said relatively smaller marine items being operable to retain marine items, generally larger than said separated relatively smaller marine items in said flow of marine items and water entering said entrance means; and means for baffling the flow of marine items and water flowing toward said marine-catch container means and including baffle means positioned generally upstream of the entrance means of said marine-catch container means, with said baffle means being operable to reduce the flow rate of water entering said entrance means of said marine catch container means so as to increase the degree of dispersion of said marine-catch therewithin.

11. Apparatus for classifying marine items in an underwater environment, to be used with floating vessel means;

marine-catch container means having marine item receiving entrance means; and operating means interconnecting said floating vessel means, and said marine-catch container means and operable, in response to movement of said floating vessel means, to induce marine-catch entrapping movement of said marine-catch container means, said apparatus being characterized by the improvement comprising:

means for separating relatively smaller marine items under water from a flow of marine items and water entering said entrance means of said marine-catch container means;

means for discharging said separated, relatively smaller marine items generally transversely of said marine-catch container means prior to the flowing of the remainder of said marine items into the entrance of said marine-catch container means;

said means for separating and discharging said relatively smaller marine items being generally operable to reduce the amount of marine items flowing toward said marine-catch container means, and increase the average size of marine items flowing toward said marine-catch container means; and said means for separating said relatively smaller marine items being operable to retain marine items, generally larger than said separated relatively smaller marine items, in said flow of marine items and water entering said entrance means; and multiple segment, flexible wall means yieldably impeding the flow of marine items and water into said marine-catch container means, with said flexible wall means including a plurality of flexible and yieldable barriers extending generally longitudinally of the flow direction of said marine items flowing toward said marine-catch container means and operable to yieldably deflect, generally laterally outwardly upstream of the entrance means of said marine-catch container means, so as to permit discharging of said relatively smaller marine-catch items; and means operable to tend to equalize water pressure generally transversely across said flexible and yieldable barriers.

12. Apparatus for classifying marine items in an underwater environment, to be used with floating vessel means;

marine-catch container means having marine item receiving entrance means; and operating means interconnecting said floating vessel means and said marine-catch container means and operable, in response to movement of said floating vessel means, to induce marine-catch entrapping movement of said marine-catch container means, said apparatus being characterized by the improvement comprising:

means for separating relatively smaller marine items under water from a flow of marine items and a water entering said entrance means of said marine-catch container means;

means for discharging said separated, relatively smaller marine items generally transversely of said marine-catch container means prior to the flowing of the remainder of said marine items into the entrance of said marine-catch container means;

said means for separating and discharging said relatively smaller marine items being generally operable to reduce the amount of marine items flowing toward said marine-catch container means, and increase the average size of marine items flowing toward said marine-catch container means; and said means for separating said relatively smaller marine items being operable to retain marine items, generally larger than said separated relatively smaller marine items, in said flow of marine items and water entering said entrance means; and expansion chamber means operable to permit the expansion of a flow of water containing marine items flowing toward said marine-catch container means, after said separating and discharging of said relatively smaller marine items;

said expansion chamber means being operable to
reduce the flow rate of water carrying said marine items, and
reduce the flow pressure of water acting on said marine items after said separating of said relatively smaller marine items.

13. Apparatus for classifying marine items in an underwater environment, to be used with
floating vessel means;
marine-catch container means having marine item receiving entrance means; and
operating means interconnecting said floating vessel means and said marine-catch container means and operable, in response to movement of said floating vessel means, to induce marine-catch entrapping movement of said marine-catch container means,
said apparatus being characterized by the improvement comprising:
means for separating relatively smaller marine items under water from a flow of marine items and water entering said entrance means of said marine-catch container means;
means for discharging said separated, relatively smaller marine items generally tranversely of said marine-catch container means prior to the flowing of the remainder of said marine items into the entrance of said marine-catch container means;
reduce the amount of marine items flowing toward said marine-catch container means; and
increase the average size of marine items flowing toward said marine-catch container means; and
said means for separating said relatively smaller marine items being operable to retain marine items, generally larger than said separated relatively smaller marine items, in said flow of marine items and water entering said entrance means; and
said means for separating said relatively smaller marine items being operable to retain marine items, generally larger than said separated relatively smaller marine items, in said flow of marine items and water entering said entrance means; and
means for separating relatively larger marine items from a flow of marine items flowing generally towards said marine-catch container means, prior to said separating and discharging of said relatively smaller marine items, and discharging said separated generally larger marine items generally laterally of said marine-catch container means;
said means for separating and discharging of said relatively larger marine items being operable to
reduce the number of items flowing toward said marine-catch container means, and
decrease the average size of marine items flowing toward said marine-catch container means.

14. Apparatus as described in claim 13 and further characterized by:

additional, multiple segment, flexible and yieldable wall means yieldably impeding the discharging of marine items and comprising
a plurality of flexible and yieldable barriers extending generally longitudinally of the flow direction of marine items flowing toward said marine-catch container means and operable to yieldably deflect generally laterally outwardly to permit said discharging of said relatively larger marine items, and
means operable to tend to equalize water pressure transversely across said plurality of flexible and yieldable barriers included in said additional wall means.

15. Apparatus as described in claim 13 and further characterized by:
additional expansion chamber means operable to permit the expansion of a flow of water containing marine items flowing toward said marine-catch container means, prior to said separating and discharging of said relatively larger marine items;
said additional expansion chamber means being operable to
reduce the flow rate of water carrying marine items, and
reduce the flow pressure of water acting on said marine items during said separating of said relatively larger marine items.

16. Apparatus for classifying marine items in an underwater environment, to be used with
floating vessel means;
marine-catch container means having marine item receiving entrance means; and
operating means interconnecting said floating vessel means and said marine-catch container means and operable, in response to movement of said floating vessel means, to induce marine-catch entrapping movement of said marine-catch container means,
said apparatus being characterized by the improvement comprising:
means for separating relatively larger marine items from a flow of marine items flowing generally towards said marine-catch container means, prior to said separating and discharging of said relatively smaller marine items, and discharging said separated generally larger marine items generally laterally of said marine-catch container means;
said separating and discharging of said relatively larger marine items being operable to
reduce the number of items flowing toward said marine-catch container means, and
decrease the average size of marine items flowing toward said marine-catch container means;
multiple segment, flexible and yieldable wall means yieldably impeding the discharging of marine items and comprising
a plurality of flexible and yieldable barriers extending generally longitudinally of the flow direction of marine items flowing toward said marine-catch container means and operable to yieldably deflect generally laterally outwardly to permit said discharging of said relatively larger marine items, and
means operable to tend to equalize water pressure transversely across said plurality of flexible and yieldable barriers included in said additional wall mean; and expansion chamber means operable to permit the expansion of a flow of water containing marine items flowing toward said marine-catch container means, prior to said separating and discharging of said relatively larger marine items;

said expansion chamber means being operable to
reduce the flow rate of water carrying marine items, and
reduce the flow pressure of water acting on said marine items during said separating of said relatively larger marine items.

17. Apparatus for classifying marine items in an underwater environment, to be used with
floating vessel means;
marine-catch container means having marine item receiving entrance means; and
operating means interconnecting said floating vessel means and said marine-catch container means and operable, in response to movement of said floating vessel means, to induce marine-catch entrapping movement of said marine-catch container means,
said apparatus being characterized by the improvement comprising:
means for separating relatively smaller marine items under water from a flow of marine items and water entering said entrance means of said marine-catch container means; and
means for discharging said separated, relatively smaller marine items generally transversely of said marine-catch container means prior to the flowing of the remainder of said marine items into the entrance of said marine-catch container means;
said means for separating and discharging said relatively smaller marine items being generally operable to
reduce the amount of marine items flowing toward said marine-catch container means, and
increase the average size of marine items flowing toward said marine-catch container means; and
said means for separating of said relatively smaller marine items being operable to retain marine items, generally larger than said separated relatively smaller marine items, in said flow of marine items and water entering said entrance means;
means for baffling the flow of marine items and water flowing toward said marine-catch container means by and including
baffle means positioned generally upstream of the entrance means of said marine-catch container means, with said baffle means being operable to reduce the flow rate of water entering said entrance means of said marine catch container means so as to increase the degree of dispersion of said marine-catch therewithin;
multiple segment, flexible wall means yieldably impeding the flow of marine items and water into said marine-catch container means, with said flexible wall means including
a plurality of flexible and yieldable barriers extending generally longitudinally of the flow direction of said marine items flowing toward said marine-catch container means and operable to yieldably deflect, generally laterally outwardly upstream of the entrance means of said marine-catch container means, so as to permit discharging of said relatively smaller marine-catch items; and
means operable to tend to equalize water pressure generally tranversely across said flexible and yieldable barriers; and
expansion chamber means operable to permit the expansion of a flow of water containing marine items flowing toward said marine-catch container means, after said separating and discharging of said relatively smaller marine items;
said expansion chamber means being operable to
reduce the flow rate of water carrying said marine items; and
reduce the flow pressure of water acting on said marine items after said separating of said relatively smaller marine items.

18. Apparatus for classifying marine items in an underwater environment, to be used with
floating vessel means;
marine-catch container means having marine item receiving entrance means; and
operating means interconnecting said floating vessel means and said marine-catch container means and operable, in response to movement of said floating vessel means, to induce marine-catch entrapping movement of said marine-catch container means,
said apparatus being characterized by the improvement comprising:
means for separating relatively larger marine items from a flow of marine items flowing generally towards said marine-catch container means, prior to said separating and discharging of said relatively smaller marine items, and discharging said separated generally larger marine items generally laterally of said marine-catch container means;
said means for separating and discharging of said relatively larger marine items being operable to
reduce the number of items flowing toward said marine-catch container means, and
decrease the average size of marine items flowing toward said marine-catch container means;
multiple segment, flexible and yieldable wall means yieldably impeding the discharging of marine items and comprising
a plurality of first flexible and yieldable barriers extending generally longitudinally of the flow direction of marine items flowing toward said marine-catch container means and operable to yieldably deflect generally laterally outwardly to permit said discharging of said relatively larger marine items, and
first means operable to tend to equalize water pressure transversely across said first flexible and yieldable barriers;
first expansion chamber means operable to permit the expansion of a flow of water containing marine items flowing toward said marine-catch container means, prior to said separating and discharging of said relatively larger marine items;
said first expansion chamber means being operable to
reduce the flow rate of water carrying marine items; and
reduce the flow pressure of water acting on said marine items during said separating of said relatively larger marine items;
means for separating relatively smaller marine items under water from a flow of marine items and water entering said entrance means of said marine-catch container means; and means for discharging said separated, relatively smaller marine items generally transversely of said marine-catch container means prior to the flowing of the remainder of said marine items into the entrance of said marine-catch container means;

said means for separating and discharging said relatively smaller marine items being generally operable to
  reduce the amount of marine items flowing toward said marine-catch container means, and
  increase the average size of marine items flowing toward said marine-catch container means; and said means for separating of said relatively smaller marine items being operable to retain marine items, generally larger than said separated relatively smaller marine items, in said flow of marine items and water entering said entrance means;

means for baffling the flow of marine items and water flowing toward said marine-catch container means and including
  baffle means positioned generally upstream of the entrance means of said marine-catch container means, with said baffle means being operable to reduce the flow rate of water entering said entrance means of said marine catch container means so as to increase the degree of dispersion of said marine-catch therewithin; and additional multiple segment, flexible wall means yieldably impeding the flow of marine items and water into said marine-catch container means, with said additional flexible wall means including
  a plurality of second flexible and yieldable barriers extending generally longitudinally of the flow direction of said marine items flowing toward said marine-catch container means and operable to yieldably deflect, generally laterally outwardly upstream of the entrance means of said marine-catch container means, so as to permit discharging of said relatively smaller marine-catch items; and
  second means operable to tend to equalize water pressure generally transversely across said second flexible and yieldable barriers; and providing second expansion chamber means operable to permit the expansion of a flow of water containing marine items flowing toward said marine-catch container means, after said separating and discharging of said relatively smaller marine items;

said second expansion chamber means being operable to
  reduce the flow rate of water carrying said marine items, and
  reduce the flow pressure of water acting on said marine items after said separating of said relatively smaller marine items.

19. A method of classifying marine items in an underwater environment, said method utilizing
floating vessel means;
marine-catch container means having marine item receiving entrance means; and
operating means interconnecting said floating vessel means and said marine-catch container means and operable, in response to movement of said floating vessel means, to induce marine-catch entrapping movement of said marine-catch container means,
said method being characterized by the improvement comprising:
separating relatively larger marine items from a flow of marine items flowing generally towards said marine-catch container means, and discharging said separated generally larger marine items generally transversely of said marine-catch container means;

said separating and discharging of said relatively larger marine items being operable to
  reduce the number of items flowing toward said marine-catch container means, and
  decrease the average size of marine items flowing toward said marine-catch container means;

said separating being effected by flowing marine items toward a series of transversely extending, generally smooth, parallel, and straight rod surfaces operable to
  permit desired marine-catch items to flow therebetween toward said marine-catch container means; and
  transversely deflect, without impedance, or gravitational deterrance said relatively larger marine items;

said rod surfaces being substantially free of connecting surfaces on the upstream sides thereof and smoothly curving in a downstream direction at the outer extremities thereof;

providing generally free yieldable wall means yieldably impeding the discharging of marine items and comprising
  generally freely yieldable barrier means extending generally longitudinally of the flow direction of marine items flowing toward said marine-catch container means and operable to yield generally outwardly to permit said discharging of said relatively larger marine items; and positioning said wall means inwardly of said outer extremities of said generally smooth, parallel, and straight rod surfaces to permit a generally free longitudinal flow of water on opposite sides thereof.

20. Apparatus for classifying marine items in an underwater environment, to be used with
floating vessel means;
marine-catch container means having marine item receiving entrance means; and
operating means interconnectng said floating vessel means and said marine-catch container means and operable, in response to movement of said floating vessel means, to induce marine-catch entrapping movement of said marine-catch container means,
said apparatus being characterized by the improvement comprising:
means for separating relatively larger marine items from a flow of marine items flowing generally towards said marine-catch container means, and discharging said separated generally larger marine items generally transversely of said marine-catch container means;

said means for separating and discharging of said relatively larger marine items being operable to
  reduce the number of items flowing toward said marine-catch container means, and
  decrease the average size of marine items flowing toward said marine-catch container means;

said means for separating and discharging of said relatively larger marine items including a series of transversely extending, generally smooth, parallel and straight rod surfaces operable to permit desired marine-catch items to flow therebetween toward said marine-catch container means, and transversely deflect, without impedance, or gravitational deterrance, said relatively larger marine items;

said rod surfaces being substantially free of connecting surfaces on the upstream sides thereof and smoothly curving in a downstream direction at the outer extremities thereof; and generally freely yieldable wall means yieldably impeding the discharging of marine items and comprising generally freely yieldable barrier means extending generally longitudinally of the flow direction of marine items flowing toward said marine-catch container means and operable to yield generally outwardly to permit said discharging of said relatively larger marine items; and said wall means being positioned inwardly of said outer extremities of said generally smooth, parallel, and straight rod surfaces to permit a generally free longitudinal flow of water on opposite sides thereof.

* * * * *